United States Patent [19]

Cruise

[11] Patent Number: 4,670,204

[45] Date of Patent: Jun. 2, 1987

[54] PROCESS OF PRODUCING AN INSULATED CONCRETE MASONRY UNIT WITH LOW DENSITY HEAT BRIDGES

[76] Inventor: Thomas E. Cruise, 954 Tropic Blvd., Delray Beach, Fla. 33444

[21] Appl. No.: 727,085

[22] Filed: Apr. 25, 1985

Related U.S. Application Data

[60] Division of Ser. No. 396,131, Jul. 7, 1982, Pat. No. 4,527,373, which is a continuation-in-part of Ser. No. 141,056, Apr. 17, 1980, abandoned.

[51] Int. Cl.[4] .......................... B22B 1/08; B29H 7/20

[52] U.S. Cl. .................................... 264/42; 264/45.5; 264/50; 264/71; 264/72; 264/333

[58] Field of Search ...................... 106/87, 88; 264/42, 264/70, 71, 72, 45.5, 50, 333; 52/405; 29/527.1

[56] References Cited

U.S. PATENT DOCUMENTS

| | | | |
|---|---|---|---|
| 2,009,984 | 7/1935 | Billner | 264/42 |
| 3,236,925 | 2/1966 | Urmston | 264/42 |
| 3,442,991 | 5/1969 | Lanz | 264/42 |
| 3,594,465 | 7/1971 | Vrijma | 264/42 |
| 4,130,973 | 12/1978 | Gustavsson | 52/405 |
| 4,357,289 | 11/1982 | Jakobsson | 264/42 |
| 4,574,064 | 3/1986 | Paakkinen | 264/71 |

FOREIGN PATENT DOCUMENTS

| | | | |
|---|---|---|---|
| 420455 | 8/1974 | U.S.S.R. | 264/42 |

*Primary Examiner*—John E. Murtagh
*Attorney, Agent, or Firm*—Bacon & Thomas

[57] ABSTRACT

A process of producing ICMUs (insulated concrete masonry units) having an inner load-bearing portion and one or two outer insulating portions are disclosed. Disregarding the insulation cores, heat flows from the outer side wall or walls to the inner portion through outer end walls and, in some embodiments, webs. These outer side walls and webs are heat bridges and are thinner and of significantly lower density than the other walls of the ICMU, thereby providing improved thermal insulation.

Also disclosed are ICMUs with a vertical or horizontal recess in one outer insulating portion. Electrical conduit and/or plumbing can be placed into these recesses. In addition, corner ICMUs are disclosed which provide increased structural strength when used to construct a 90° corner between two structural walls because of a special mid-wall in the corner ICMU.

15 Claims, 26 Drawing Figures

PROCESS OF PRODUCING AN INSULATED CONCRETE MASONRY UNIT WITH LOW DENSITY HEAT BRIDGES

This application is a divisional of application Ser. No. 06/396,13 filed July 7, 1982, now U.S. Pat. No. 4,527,373 dated July 9, 1985, which a continuation-in-part of application Ser. No. 06/141,056 filed Apr. 17, 1980, now abandoned.

BACKGROUND OF THE INVENTION

1. Field of the Invention

The present invention relates to concrete masonry units (CMUs) that are united to form structures. The CMUs are generally prepared by placing a mixture of concrete, aggregate, water, and sand into a mold, compacting the mixture in the mold, and then drying it.

More specifically, the present invention relates to CMUs that incorporate a thermal insulating material therein, which are hereinafter referred to as insulated concrete masonry units (ICMUs). Most specifically, the present invention relates to ICMUs having heat bridges of relatively low density and minimal size.

2. Description of the Prior Art

Numerous attempts have been made in the prior art to provide a practical ICMU. When the walls of a structure are constructed with conventional CMUs, a secondary operation of providing the walls with insulation is necessary if the interior of the structure is to be economically maintained at a temperature different from that existing on the exterior of the structure. This second step of insulating the walls requires additional materials and labor which causes a large increase in the cost of building the walls of the structure. A practical ICMU is desirable because it eliminates the need for this second insulating operation.

Where ICMUs are used, there is a significant dollar savings in the cost of building the finished walls of the insulated structure. The labor involved where ICMUs are used is virtually the same as is required where conventional noninsulated CMUs are used, i.e., the ICMUs are put in place one-by-one and are secured to each other by surface bonding or a mortar of some type. The increased cost of an ICMU over a noninsulated CMU is not substantial when compared to the cost of the labor for the second insulating operation that is required where noninsulated CMUs are used. With this economic motivation, various attempts have been made to provide the art with a practical pre-formed ICMU.

The following is a brief discussion of selected prior art.

U.S. Pat. No. 4,027,445 discloses an ICMU. It is of conventional structure, and comprises two end walls, two side walls, and a mid-wall extending from one side wall to the other at a point approximately equidistant between the two end walls. First and second insulating inserts, formed of a lightweight foraminous heat insulating and fire retarding material, are provided in a shape that is adapted to be inserted into the two cavities in the structure of the CMU. These insulating inserts are first formed in a mold of some type and allowed to harden. The inserts are then inserted into the cavities in the CMU. Thus, the ICMU of this patent is formed by a three-step process: making the CMU, making the insulating insert, and then inserting the insulating insert into the CMU. The insulating inserts do not provide insulation across the entire side wall face of the ICMU. The insulating zones are interrupted by the thick load-bearing mid-wall and the two end walls.

U.S. Pat. No. 3,292,331 discloses interlocking blocks that form a wall construction. The block may be a CMU or may be formed of plastic (column 2, line 13). FIG. 4 of this patent illustrates a modification of the block unit that is provided with longitudinally disposed passages which are adapted to receive a slab of insulating material. This slab of insulating material provides an essentially continuous insulation zone across the side wall face of the block. However, the block is virtually a solid piece, which greatly increases its weight. This increased weight increases the cost of transporting and handling the block and requires that the static structure be provided with a stronger foundation because of the increased weight of the walls themselves. The blocks of the patent are not provided with a balanced handhold for masons, and cannot be laid in a running pattern (i.e., each course of block offset by 50%), which is stronger than the stacked pattern shown in FIG. 1 of the patent. Furthermore, according to the design of the block shown in FIG. 4, this block cannot be fabricated in a conventional block production facility.

A commercial product known and advertised as the Waukesha Insulation Block is an ICMU wherein the insulation zone is not interrupted by a thick midwall connecting the side walls. However, the insulation zone does not extend the full length of the side wall because the thick load-bearing end walls prevent it from doing so.

A proposed commercial product, advertised as the Thermoblock, is provided with a series of insulating pockets that extend along the face of each side wall. These insulating pockets provide an insulation zone that extends along each side face and is interrupted only by relatively thin load-bearing walls in between the insulation pockets. However, these relatively thin walls in between the insulation pockets have proved to be a major detriment to the use of the Thermoblock. They are insufficient to meet the load-bearing requirements of CMUs that are recognized in the art as those needed to comply with the ASTM C-90 standards.

West German Offenlegungsschrift No. 27 37 012 discloses a heat and noise insulating hollow brick comprising a thin outside layer and a much thicker inner load carrying part. It does not appear to be provided with a balanced hand hold for a mason and is designed to be laid in a stacked pattern (as shown in FIG. 3 of the Off.) rather than a running pattern. Furthermore, its obviously large size and weight would be detrimental to conventional block transportation and erection techniques.

SUMMARY OF THE INVENTION

The present invention overcomes the problems of the prior art ICMUs by providing an ICMU that comprises an inner load-bearing portion, and one or two outer insulating portions. Each outer insulating portion comprises an outer side wall attached to the inner load-bearing portion by outer end walls, and in some embodiments by a web or webs. The outer end walls and the webs when employed, are of a lower density than the walls of the inner load-bearing portion and the outer side wall. These low density outer end walls and webs are heat bridges which preferably are thinner than the outer side wall, which is thinner than the walls of the inner load-bearing portion. All heat that is transferred through the CMU portion (i.e., the ICMU exclusive of the insulation cores) of the ICMUs of the present invention is transferred through the outer end walls, and in some embodiments webs, of lower density, which have better insulative qualities than the walls of higher density, thereby producing an ICMU of superior insulative value.

In the standard ICMU of the present invention, the inner load-bearing portion comprises two side walls, two end walls, and a mid-wall. The mid-wall connects the two side walls and is approximately equidistant from each of the end walls so that it provides a balanced handhold for masons. The walls of the inner load-bearing portion are of sufficient density and thickness to meet the minimum load-bearing requirements that are recognized in the art as ASTM C-90, published by the American Society for Testing & Materials, which are hereby incorporated by reference. A copy of ASTM C-90 is available in the file wrapper.

A half-ICMU is provided by the present invention. It is basically one-half of a standard ICMU. The inner load-bearing portion comprises two end walls and two side walls. There is no mid-wall.

A corner ICMU is also provided by the present invention. The inner load-bearing portion of the corner ICMU comprises two side walls, two end walls, and a special mid-wall. The mid-wall connects the two side walls and is approximately equidistant from each of the end walls.

The mid-wall may be X-shaped or K-shaped, which provides a significant advantage where two structural walls meet to form a corner. When the standard ICMU of the present invention is used to form two walls of a structure that intersect at a right angle, part of the load-bearing portion of each ICMU is unsupported at the intersection because it is directly above one of the square shaped central cores of the ICMU below it. However, when a corner ICMU of the present invention is used at the intersection of two walls meeting at a right angle, an increased amount of the load-bearing portion of each ICMU in the intersection is supported by the specially shaped mid-wall directy below it. This advantage is more fully described by FIG. 13 and the accompanying text below.

The insulating portion or portions of the standard ICMU, the half-ICMU, and the corner ICMU of the present invention are substantially identical. Each outer insulating portion comprises an insulation core, two outer end walls, and an outer side wall. In some embodiments of the invention, the insulating portion also comprises a web or webs. In the preferred embodiment, two insulating portions are present in each ICMU. The outer side wall is not load-bearing and, therefore, is usually much thinner than the load-bearing walls of the inner portion. The outer side wall is usually thicker than the outer end walls or webs because it provides the exterior face of the ICMU in finished walls. It is critical that the outer end walls and any webs are of a significantly lower density than the walls of the inner load-bearing portion.

The lower density of the outer end walls of each insulating portion of the ICMUs of the present invention produces a block of superior insulative qualities. In structural walls, the insulative quality of an ICMU depends upon its ability to reduce heat flow from one face of the wall to the other. As an example, consider the preferred embodiment of the standard ICMU of the present invention (shown in FIG. 1), which contains two insulating portions. If the standard ICMU is present in a structural wall, heat contacts one exposed face, or one outer side wall, of it. The insulative material in the insulation core has a much better insulating value than any portion of the ICMU formed of a concrete masonry material. Accordingly, the only significant heat flow from the outer side wall to the inner load-bearing portion of the ICMU would be through the outer end walls and the webs (which are not present in some embodiments of the invention). The heat would flow through the inner load-bearing portion of the block and then through the outer end walls and the webs on the other side of the ICMU to the outer side wall on the other face of the ICMU. Thus, all significant heat flow through the ICMUs of the present invention must pass through the outer end walls and the webs, which are heat bridges. According to the present invention, these heat bridges are of the smallest size possible while still maintaining the structural integrity of the insulation core portion of the ICMU. In addition, the heat bridges are of a significantly lower density than walls of the inner load-bearing portion and, in the preferred embodiments, than the outer side walls. The lower density of these heat bridges is caused by a greater amount of air being present in the concrete masonry material, which gives them superior insulative qualities. In the method of making the ICMUs of the present invention more fully discussed below, a concrete masonry material is agitated so that it contains a relatively large amount of air, this mixture is deposited into a mold, and the material which forms the inner load-bearing portion and (in the preferred embodiments) the outer side walls is compacted. This compaction of all walls except the heat bridges gives them a much higher density and hence a lower insulative value.

The heat bridges (outer end walls, and the webs when employed) have a density gradient. They are most dense adjacent the compacted side walls and outer side walls, and are least dense at a point midway between the side walls and the outer side walls.

In one ICMU made according to the present invention, the density of a load-bearing wall was about 26 g./cu.in. (about 99 lb./cu.ft.), and the density of a web at a point approximately midway between the outer side wall and the side wall was about 16 g./cu.in. (about 61 lb./cu.ft.). Thus, the least dense portion of the web had a density of about 60% of the density of the load-bearing wall.

It is also preferred in the ICMUs of the present invention that a lightweight aggregate is used to make the concrete masonry material that is used to form the CMU portion thereof. Lightweight aggregates have better insulating properties than heavyweight aggregates. It is preferred that the heat bridges (outer end walls and webs) of the present invention be composed of a concrete masonry material made from lightweight aggregates.

The present invention also provides horizontal conduit and plumbing (HCP) ICMUs and vertical conduit and plumbing (VCP) ICMUs. An HCP ICMU is provided with a horizontal recess in one of the insulating portions. A VCP ICMU is provided with a vertical recess in one of the insulating portions. These recesses are adapted to receive plumbing and/or pre-wired electric conduit. In a structural wall, the interior face contains a single course (horizontal layer) of HCP ICMUs above the floor. At least one point of the wall contains a vertical recess through the lower courses of ICMUs (provided by VCP ICMUs) to a position below the floor or through the upper courses of ICMUs (provided by VCP/ICMUs) to a position above the ceiling. Plumbing and/or pre-wired electric conduit is placed into the horizontal recess and connected to a water source and/or a power source (each of which is located below the floor or above the ceiling), respectively, by plumbing and/or electric conduit in the vertical recess. These recesses are then filled to provide an interior wall surface that is uniform and aesthetically pleasing because it contains only plumbing fixtures and/or electric outlets (the plumbing and conduit having been filled).

The insulation core of each insulating portion comprises any conventional thermal insulating material and, in the preferred embodiment, comprises a polyurethane foam material that is injected into the insulation cores.

The ICMUs of the present invention allow the entire load to be carried by the relatively dense, thick walls of the inner portion. Thus, the ASTM C-90 standards for load-bearing capacity, dimensions, and purpose are met entirely by the inner load-bearing portion. This allows the ICMU to be placed directly on a noninsulated CMU which has the same load-bearing surface as the inner portion of the ICMU. This two portion concept also allows the walls of the outer insulating portion to be relatively thin because they bear no portion of the load.

The fact that the load-bearing portion of the present ICMU is separated from the insulated portion allows the thermal leakage normally associated with the mortar joints between the ICMUs to be alleviated. The mortar between the present ICMUs need only be applied to the load-bearing portions because the entire load is transferred by the inner load-bearing portion. If mortar is applied only to the inner load-bearing portion, then there is a recess surrounding the insulative portions of each ICMU. This recess can be filled with an insulative material, such as strips of a polyurethane foam material that have been pre-cut to the appropriate size. Furthermore, a thermal barrier at the mortar joint can be provided in the ICMU production sequence as shown in FIG. 15.

It is also possible to construct walls using the ICMUs of the present invention without mortar joints. The ICMUs are stacked to form a wall and then the surface of the wall is covered with a surface bonding cement. A suitable cement is the one sold under the tradename Fiberbond by Stone Mountain Manufacturing Co., Inc. It is a cementitious mixture produced by uniformly blending Portland cement, sand, and alkali resistant glass fibers to form a dry mix, to which water is added. The aqueous mixture may be applied to the wall surface by hand troweling or spraying.

DESCRIPTION OF THE PREFERRED EMBODIMENTS

Figure 1:
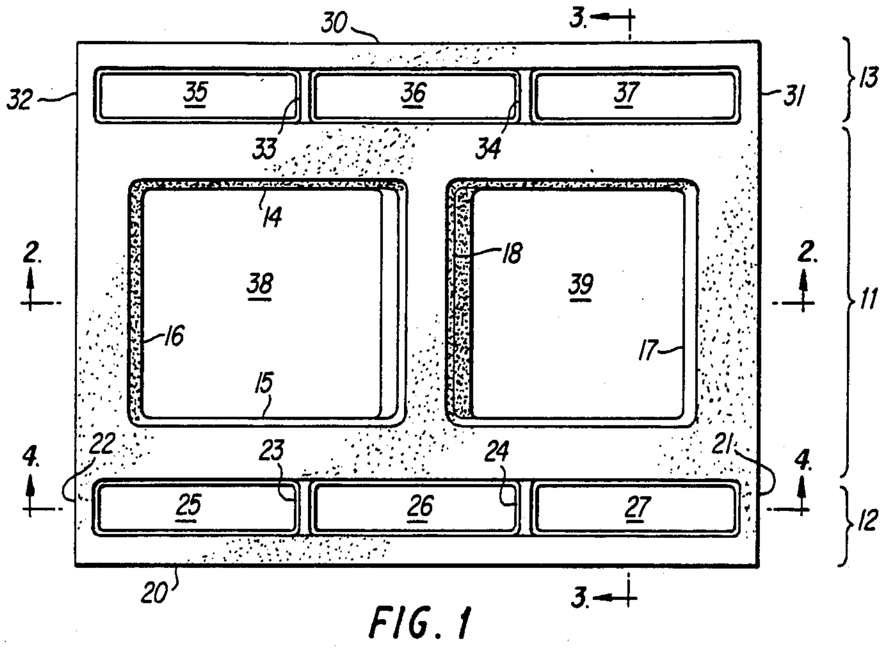
FIG. 1 is a top view of the standard ICMU of the present invention.

With reference to FIG. 1, the top view of the standard ICMU (with an 8 inch load-bearing width) of the present invention discloses inner load-bearing portion 11 as well as outer insulating portions 12 and 13. Load-bearing portion 11 comprises side walls 14 and 15, end walls 16 and 17, and mid-wall 18. Side walls 14 and 15 are co-extensive with the length of the block. End walls 16 and 17 are continuous with, and connect, side walls 14 and 15. Mid-wall 18 is located at a position approximately equidistant from end walls 16 and 17. Mid-wall 18 is continuous with, and connects, side walls 14 and 15, thereby forming central cores 38 and 39.

Insulating portion 12 comprises outer end walls 21 and 22 and outer side wall 20. Outer side wall 20 is co-extensive with the length of the block and is connected to load-bearing side wall 15 by outer end walls 21 and 22, and by webs 23 and 24, thereby forming insulation cores 25, 26, and 27.

Insulating portion 13 comprises outer side wall 30 that is connected to load-bearing side wall 14 by outer end walls 31 and 32, and by webs 33 and 34, thereby forming insulation corese 35, 36, and 37.

The first preferred embodiment of the standard ICMU (with an 8 inch load-bearing width) of the present invention has an overall length of 16 inches, an overall height of about 8 inches, and an overall width of $11\frac{5}{8}$ inches. Inner load-bearing portion 11 has a width of $7\frac{1}{2}$ inches. The load bearing side walls 14 and 15 and the outer side walls 20 and 30 both have a length of 16 inches. The load-bearing end walls 16 and 17 and the load-bearing mid-wall 18 each have a length of $5\frac{5}{8}$ inches. Outer end walls 21, 22, 31, and 32, and webs 23, 24, 33, and 34 each have a length of $1\frac{1}{4}$ inches.

In general, the length of the webs and the outer end walls is preferably from 1 to $1\frac{1}{2}$ inches, more preferably from $1\frac{1}{8}$ to $1\frac{5}{8}$ inches, and most preferably about $1\frac{1}{4}$ inches. As their length varies, the width of the outer side wall varies correspondingly to keep the overall width of the ICMU constant.

Figure 2:
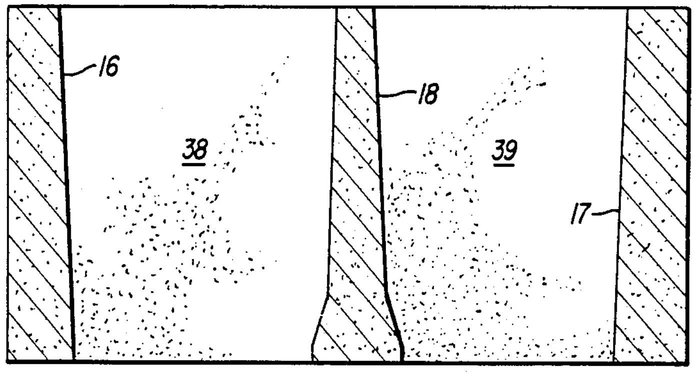
FIG. 2 is a cross-sectional view of the standard ICMU of the present invention taken along line 2—2 of FIG. 1.

FIG. 2 is a cross section of the standard ICMU of the present invention taken along line 2—2 of FIG. 1. Load-bearing end walls 16 and 17 and load-bearing mid-wall 18 are shown in cross section. The outer surfaces of load-bearing mid-wall 18 are tapered so as to provide an increasing width from top to bottom. Load-bearing end walls 16 and 17 are provided with straight outer surfaces while the inner surfaces are tapered so as to provide an increasing width from top to bottom.

In the first preferred embodiment, load-bearing mid-wall 18 has a width of 1 inch at the top of the block and gradually tapers out to a width of 3 inches at the bottom of the block. A final flaring out of mid-wall 18 begins $1\frac{1}{2}$ inches above the bottom of the block and flares out so that the bottom $\frac{5}{8}$ inch of mid-wall 18 is 3 inches thick. This provides a grip area for the mason, making it easier for him to hold the unit. Without this final flaring out, mid-wall 18 would continuously taper from a width of 1 inch at the top to a width of $1\frac{1}{4}$ inches at the bottom. The outer surfaces of load-bearing end walls 16 and 17 are straight while the inner edges thereof are tapered from a width of $1\frac{1}{4}$ inches at the top to a width of $1\frac{1}{2}$ inches at the bottom.

Figure 3:
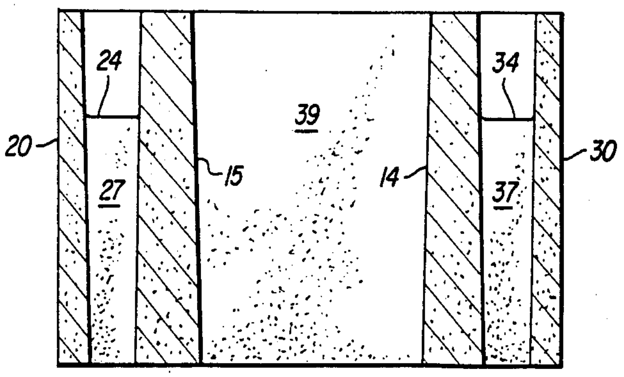
FIG. 3 is a cross-sectional view of the standard ICMU of the present invention taken along line 3—3 of FIG. 1.

FIG. 3 shows a cross-section of the standard ICMU of the present invention taken along line 3—3 of FIG. 1. Load-bearing side walls 14 and 15 each have two tapered surfaces. Outer side walls 20 and 30 have straight outer surfaces and tapered inner surfaces. Insulation cavities 27 and 37 are formed by walls 15 and 20, and 14 and 30, respectively.

In the first preferred embodiment, outer side walls 20 and 30 taper from a thickness of $\frac{5}{8}$ inch at the top to a thickness of 13/16 inch at the bottom. Load-bearing side walls 14 and 15 taper from a thickness of $1\frac{1}{4}$ inches at the top to a width of $1\frac{5}{8}$ inches at the bottom. Webs 24 and 34 each have a height of $5\frac{1}{2}$ inches.

Figure 4:
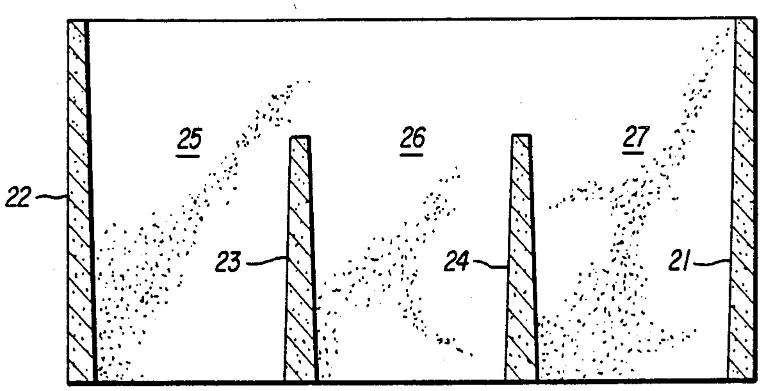
FIG. 4 is a cross-sectional view of the standard ICMU of the present invention taken along line 4—4 of FIG. 1.

FIG. 4 shows a cross-section of the standard ICMU of the present invention taken along line 4—4 of FIG. 1. Outer end walls 21 and 22 each have a straight outer edge and a tapered inner edge. Webs 23 and 24 have two tapered surfaces.

In the first preferred embodiment, outer end walls 21 and 22 taper from a width of $\frac{5}{8}$ inch at the top to a width of 9/16 inch at the bottom. Webs 23 and 24 taper from a width of $\frac{5}{8}$ inch at the top to $\frac{1}{2}$ inch at the bottom.

In the first preferred embodiment, each of central cores 38 and 39 (see FIG. 1) has a length of 5 inches along the bottom edge of each of load-bearing walls 14 and 15, and a width of $5\frac{5}{8}$ inches.

The dimensions given for the first preferred embodiment are illustrative and not limiting. Obviously, variations of these dimensions are within the skill of those of ordinary skill in the art. As to the load-bearing portion of the ICMU, it must meet the requirements of ASTM C-90, "Standard Specification for Hollow Load-Bearing Concrete Masonry Unit", published by the American Society for Testing and Materials.

As to the insulating portions, variations are also with the skill of those of ordinary skill in the art. The outer end walls can vary in length depending on thickness of the insulation cores desired, and lengths from 1 inch through $1\frac{1}{2}$ inches are possible. The width of the outer end walls can also vary depending on the capabilities of the block machine used to produce the ICMUs, widths from $\frac{1}{8}$ inch through $\frac{5}{8}$ inch are possible, and the thinnest width allowed by the sophistication of each individual machine is preferred. The length, width and height of the webs can also be varied. The length is obviously determined by the length of the outer end walls. The width is dependent on the number of webs, the widths of the adjacent side wall and outer side wall, and the height of the web. The height of the web can vary from the height of the ICMU to less than 25% of its height. In addition, the webs can be removed altogether.

The outer side wall can vary in width depending on a variety of factors including the number and size of the webs, the size of the outer end walls, and the nature of the materials used. This variation includes widths from $\frac{5}{8}$ inch to $\frac{7}{8}$ inch.

Excluding the insulating material injected into the insulation cores, the ICMUs of the present invention are made of conventional CMU material. However, lightweight (rather than heavyweight), water and mineral aggregate are mixed, fed into a mold, compacted and dried. Subsequently, the insulating material is added to the insulation cores. The relative amounts of cement, water and aggregate are within the skill of those of ordinary skill in the art. As an example, the following weight percentages of ingredients are given: 27% cement; 61% pumice; 8% water; and 4% sand. As an example of variations within the skill of those of ordinary skill in the art, the water could be increased to 12% and the sand deleted.

The density of the compacted areas of the finished ICMU (at least the inner load bearing portion) is normally between 30 and 100 lbs./cu.ft., preferably less than 90 lbs./cu.ft., and most preferably less than 80 lbs./cu.ft.

The minimum strength of the load-bearing portion of ICMU is 1200 lbs./cu.in., preferably more than 1300 lbs./cu.in., and most preferably more than 1500 lbs./cu.in.

Lightweight aggregates produce lightweight concretes. Lightweight concretes have densities below about 100 lbs./cu.ft. Examples of various concretes are given below in Table 1:

TABLE 1

| Type of Concrete | Density (lbs./cu. ft.) |
|---|---|
| Cellular Concrete | 25-44 |
| Pumice Concrete | 60-86 |
| Expanded Clay Shale Slate and Sintered Concrete | 75-90 |
| Scoria Concrete | 75-100 |
| Expanded Slag Concrete | 80-105 |
| Coal Cinder Concrete | 80-105 |
| Air Cooled Slag Concrete | 100-125 |
| Crushed Stone and Sand Concrete | 120-140 |
| Sand and Gravel Concrete | 130-145 |

The preferred lightweight aggregate of the present invention is a pumice having a dry, loose density of about 40 lbs./cu.ft. which gives an ICMU product having a density of about 80 lbs./cu.ft. or less in the compacted areas.

Figure 5:
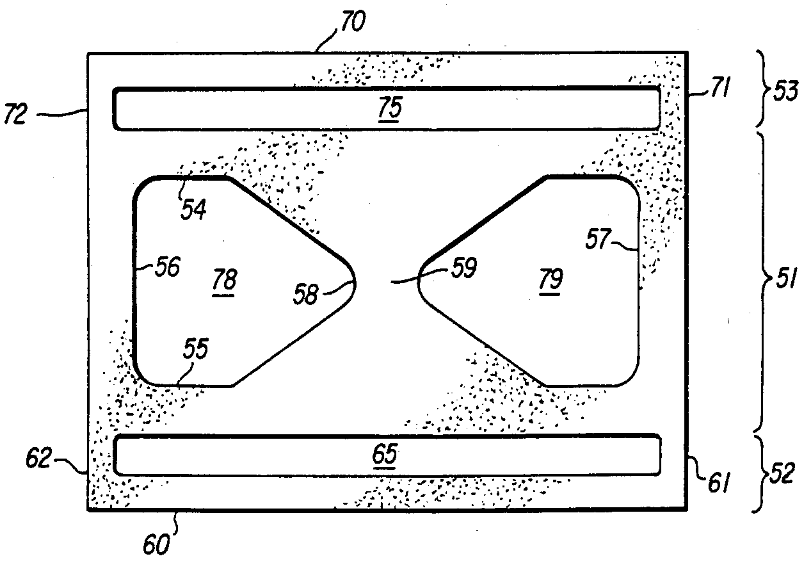
FIG. 5 is a top view of the corner ICMU of the present invention.

FIG. 5 discloses a top view of the corner ICMU of the present invention, which comprises inner load-bearing portion 51 as well as outer insulating portions 52 and 53. Load-bearing portion 51 comprises side walls 54 and 55, end walls 56 and 57, and X-shaped mid-wall 58. Side walls 54 and 55 are co-extensive with the length of the block. End walls 56 and 57 are continuous with, and connect, side walls 54 and 55. Mid-wall 58 is located at a position approximately equidistant from end walls 56 and 57, and is continuous with and connects side walls 54 and 55. Mid-wall 58 tapers from its thickest point adjacent side walls 54 and 55 to its narrowest point 59, which is approximately equidistant from the side walls 54 and 55, and separates central cores 78 and 79.

Insulating portion 52 comprises outer end walls 61 and 62 and outer side wall 60. Outer side wall 60 is co-extensive with the length of the block, and is connected to load-bearing side wall 55 by outer end walls 61 and 62, thereby forming insulation core 65.

While insulating portion 52 is illustrated without webs as are a number of the insulating portions discussed below, they could obviously be provided with webs (such as those shown in FIGS. 1, 3 and 4).

Insulating portion 53 comprises outer side walls 70 that is connected to load-bearing side wall 54 by outer end walls 71 and 73, thereby forming insulation core 75.

Figure 13:
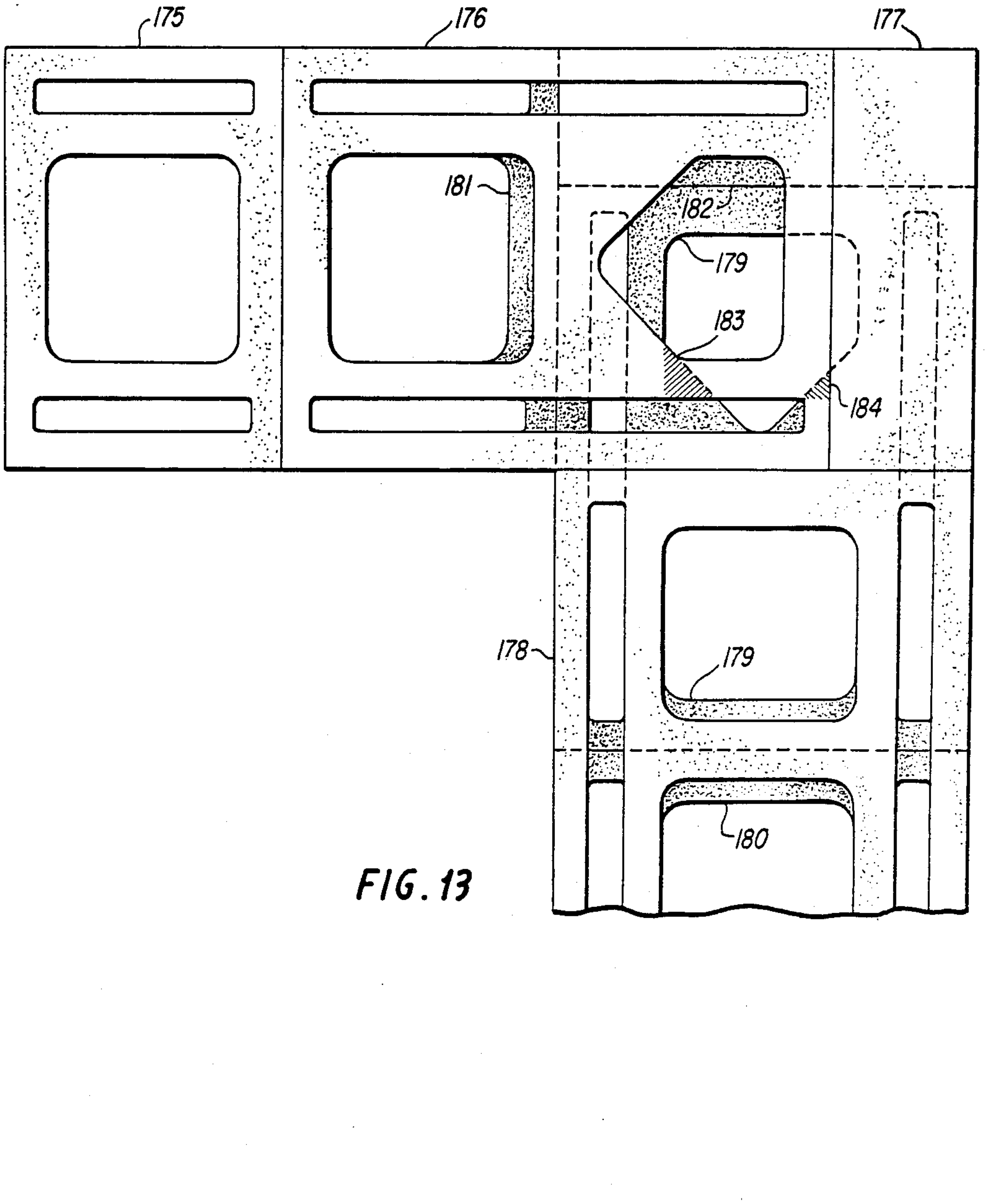
FIG. 13 is a top elevational view of the right angle corner of two structural walls built with the ICMUs of the present invention.

The first preferred embodiment of the corner ICMU of the present invention has an overall length of 16 inches and an overall width of 11$\frac{5}{8}$ inches. Inner load-bearing portion 51 has a width of 7$\frac{7}{8}$ inches. The load-bearing side walls 54 and 55 and the outer side walls 60 and 70 all have a length of 16 inches. The load-bearing end walls 56 and 57 and the load-bearing mid-wall 58 each have a length of 5$\frac{3}{8}$ inches. The narrowest point 59 of load-bearing mid-wall 58 tapers from a width of 1$\frac{7}{8}$ inches at the top of the block to a width of 2$\frac{1}{8}$ inches at the bottom of the block. Mid-wall 58 is continuous with each of load-bearing side walls 54 and 55 for a length of 7-1/16 inches. The outer surfaces of load-bearing end walls 56 and 57 are straight while the inner edges thereof are tapered from a width of 1$\frac{1}{4}$ inches at the top of the block to a width of 1$\frac{1}{2}$ inches at the bottom. The exterior surfaces of outer side walls 60 and 70 are flat while the interior surfaces thereof taper from a thickness of $\frac{5}{8}$ inch at the top of the block to a thickness of 13/16 inch at the bottom of the block. Load-bearing side walls 54 and 55 taper from a thickness of 1$\frac{1}{4}$ inches at the top to a width of 1$\frac{3}{8}$ inches at the bottom. Outer end walls 71, 72, 61, and 62 taper from a width of $\frac{3}{8}$ inch at the top to a width of 9/16 inch at the bottom. Central cores 78 and 79 are each of pentagonal shape. In another embodiment of the corner ICMU of the present invention, mid-wall 58 is of a K-shape (rather than an X-shape), thereby forming one pentagonal central core as shown here and one conventional square central core. A corner ICMU with a K-shaped mid-wall is shown in FIG. 13.

Figure 6:
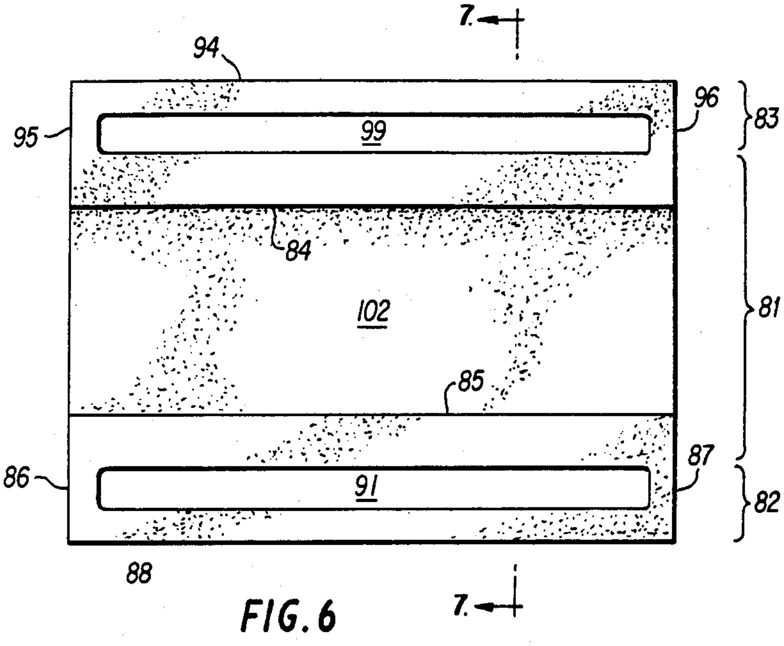
FIG. 6 is a top view of the lintel ICMU of the present invention.
Figure 7:
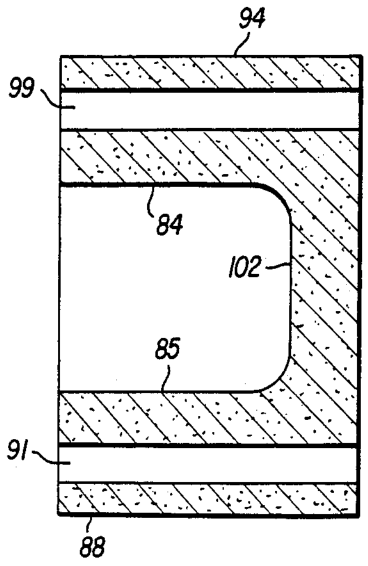
FIG. 7 is a cross-sectional view of the lintel ICMU of the present invention taken along line 7—7 of FIG. 6.

FIGS. 6 and 7 disclose the lintel ICMU of the present invention. With reference to FIG. 6, the top view of the lintel ICMU of the present invention discloses inner load-bearing portion 81 and outer insulating portions 82 and 83. Load-bearing portion 81 comprises side walls 84 and 85, and bottom wall 102. Side walls 84 and 85 are co-extensive with the length of the block. Bottom wall 102 is continuous with, and connects, side walls 84 and 85.

Insulating portion 82 comprises outer end walls 86 and 87, and outer side wall 88. Outer side wall 88 is co-extensive with the length of the block, and is connected to load-bearing side wall 85 by outer end walls walls 86 and 87, thereby forming insulation core 91.

Insulating portion 83 comprises outer side wall 94 that is connected to load-bearing side wall 84 by outer end walls 95 and 96, thereby forming insulation core 99.

The first preferred embodiment of the lintel ICMU of the present invention has an overall length of 16 inches and an overall width of 11$\frac{5}{8}$ inches. Inner load-bearing portion 81 has a width of 7$\frac{1}{2}$ inches. The load-bearing side walls 84 and 85 and the outer side walls 88 and 94 each have a length of 16 inches. Outer end walls 86, 87, 95, and 96 all have a length of 1$\frac{1}{4}$ inches and taper from a width of $\frac{3}{8}$ inch at the top of 9/16 inch at the bottom.

FIG. 7 shows a cross section of the lintel ICMU of the present invention taken along line 7—7 of FIG. 6. Outer side walls 88 and 94 have straight outer surfaces and tapered inner surfaces. Bottom wall 102 connects load-bearing side walls 84 and 85.

In the first preferred embodiment, outer side walls 88 and 94 taper from a thickness of $\frac{5}{8}$ inch at the top of the block to a thickness of 13/16 inch at the bottom of the block. Load-bearing walls 84 and 85 taper from a thickness of 1$\frac{1}{4}$ inches at the top to a width of 1$\frac{3}{8}$ inches at the bottom. Bottom wall 102 has a height of at least 1$\frac{3}{4}$ inches and a width of 5$\frac{3}{8}$ inches. The present invention includes a lintel VCP ICMU, not illustrated.

Figure 8:
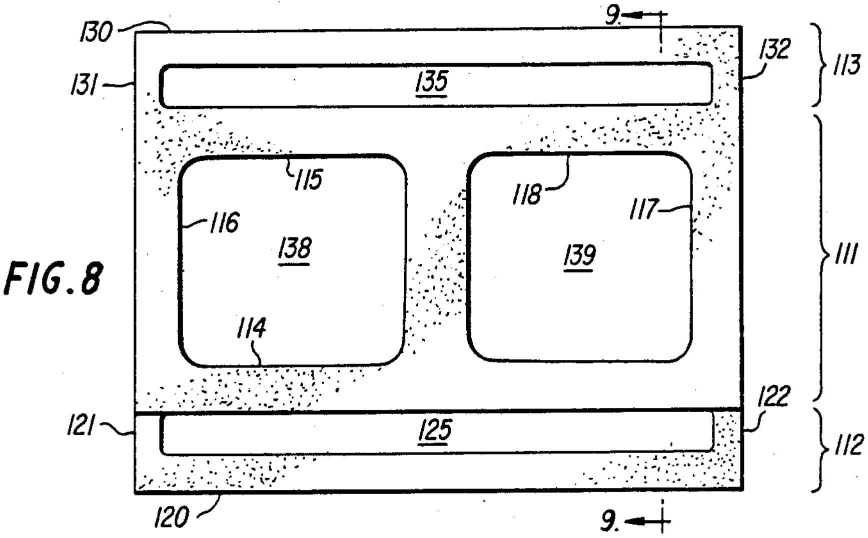
FIG. 8 is a top view of the horizontal conduit and plumbing (HCP) ICMU of the of the present invention.
Figure 9:
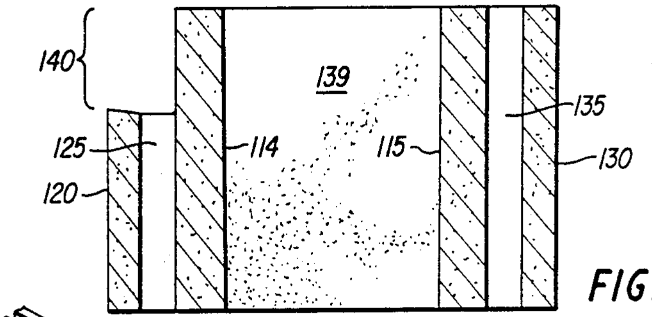
FIG. 9 is a cross-sectional view of the horizontal C/P ICMU of the present invention taken along line 9—9 of FIG. 8.

FIGS. 8 and 9 disclose the horizontal conduit and plumbing (HCP) ICMU of the present invention. With reference to FIG. 8, the top view of the HCP ICMU of the present invention discloses inner load-bearing portion 111 as well as outer insulating portions 112 and 113. Load-bearing portion 111 comprises side walls 114 and 115, end walls 116 and 117, and mid-wall 118. Side walls 114 and 115 are co-extensive with the length of the ICMU. End walls 116 and 117 are continuous with, and connect, side walls 114 and 115. Mid-wall 118 is located at a position approximately equidistant from end walls 116 and 117, and is continuous with, and connects, side walls 114 and 15, thereby forming central cores 138 and 139.

Insulating portion 112 comprises outer end walls 121 and 122, and outer sidewall 120. Outer side wall 120 is co-extensive with the length of the ICMU, and is connected to load-bearing side wall 114 by outer end walls 121 and 122, thereby forming insulation core 125.

Insulating portion 113 comprises outer side wall 130 that is connected to load-bearing side wall 115 by outer end walls 131 and 132, thereby forming insulation core 135.

FIG. 9 shows a cross section of the HCP ICMU of the present invention taken along line 9—9 of FIG. 8. The HCP ICMU of the present invention is provided with horizontal recess 140 formed by load-bearing side wall 114, and the tops of outer end walls 121 and 122 and outer side wall 120. The exterior surface of outer side wall 120 terminates about 2$\frac{1}{2}$ inches below the upper surface of the ICMU. The upper surfaces of outer side wall 120 and out end walls 121 and 122 slope slightly downward from the exterior surface of outer side wall 120. Recess 140 is adapted to receive prewired electrical conduit and/or plumbing as will be more fully described below in the description of FIG. 12.

The first preferred embodiment of the HCP ICMU of the present invention is similar to the first preferred embodiment of the standard ICMU of the present invention with the exception of walls 120, 121, and 122, which are reduced in height so as to form recess 141. If insulating portion 112 is provided with webs, then the webs extend from the bottom of the ICMU to the tops of walls 120, 121, and 122.

Figure 10:
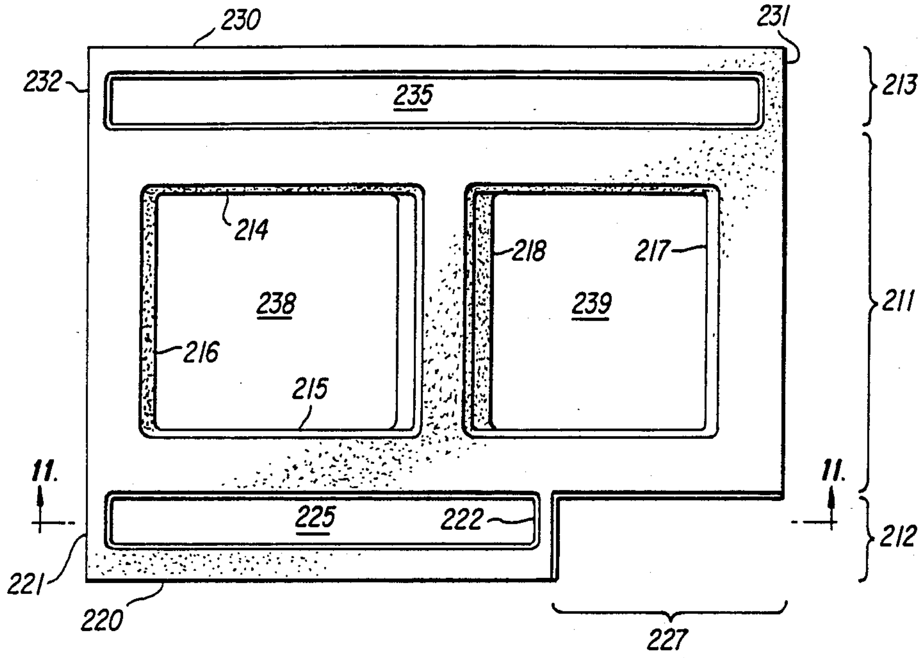
FIG. 10 is a top view of the vertical conduit and plumbing (VCP) ICMU of the present invention.
Figure 11:
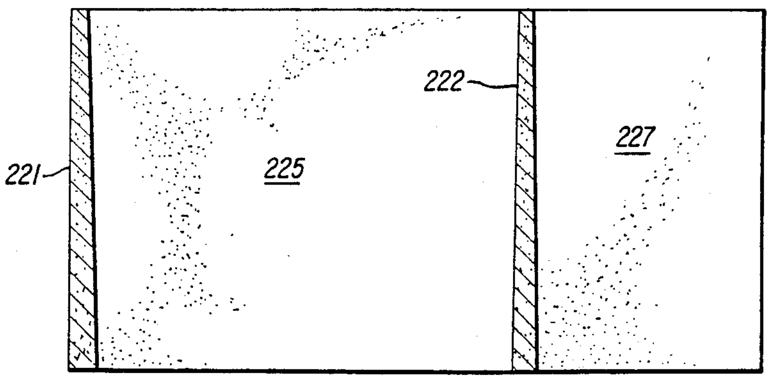
FIG. 11 is a cross-sectional view of the VCP ICMU of the present invention taken along line II—II of FIG. 10.

FIGS. 10 and 11 disclose the vertical conduit and plumbing (VCP) ICMU of the present invention. With reference to FIG. 10, the top view of the VCP ICMU of the present invention disclosed the inner load-bearing portion 211 as well as outer insulating portions 212 and 213.

Load-bearing portion 211 comprises side walls 214 and 215, end walls 216 and 217, and mid-wall 218. Side walls 214 and 215 are co-extensive with the length of the ICMU. End walls 216 and 217 are continuous with, and connect, side walls 214 and 215. Mid-wall 218 is located at a position approximately equidistant from end walls 216 and 217, and is continuous with, and connects, side walls 214 and 215, thereby forming central cores 238 and 239.

Insulating portion 212 comprises outer end walls 221 and 222, and outer side wall 220. Outer side wall 220 is co-extensive with from 25% to 60% of the length of the ICMU, and is connected to load-bearing side wall 214 by outer end walls 221 and 222, thereby forming insulation core 225 and vertical recess 227.

Insulating portion 213 comprises outer side wall 230 that is connected to load-bearing side wall 214 by outer end walls 231 and 232, thereby forming insulation core 235.

FIG. 11 shows a cross section of the VCP ICMU of the present invention taken along line 11—11 of FIG. 10. The VCP ICMU of the present invention is provided with vertical recess 227 formed by load-bearing side wall 215, outer end wall 222, and outer side wall 220. In the finished VCP ICMU, insulation core 225 is filled with a thermal insulating material and vertical recess 227 is left empty so as to provide a passage for the electrical conduit and/or plumbing from the floor or the ceiling of the structure to the course of HCP ICMUs.

The first preferred embodiment of the VCP ICMU of the present invention is similar to the first preferred embodiment of the standard ICMU of the present invention, except that outer side wall 220 is only 10 inches in length. If insulation core 235 is provided with two webs, insulation core 225 would have only one.

Figure 12:
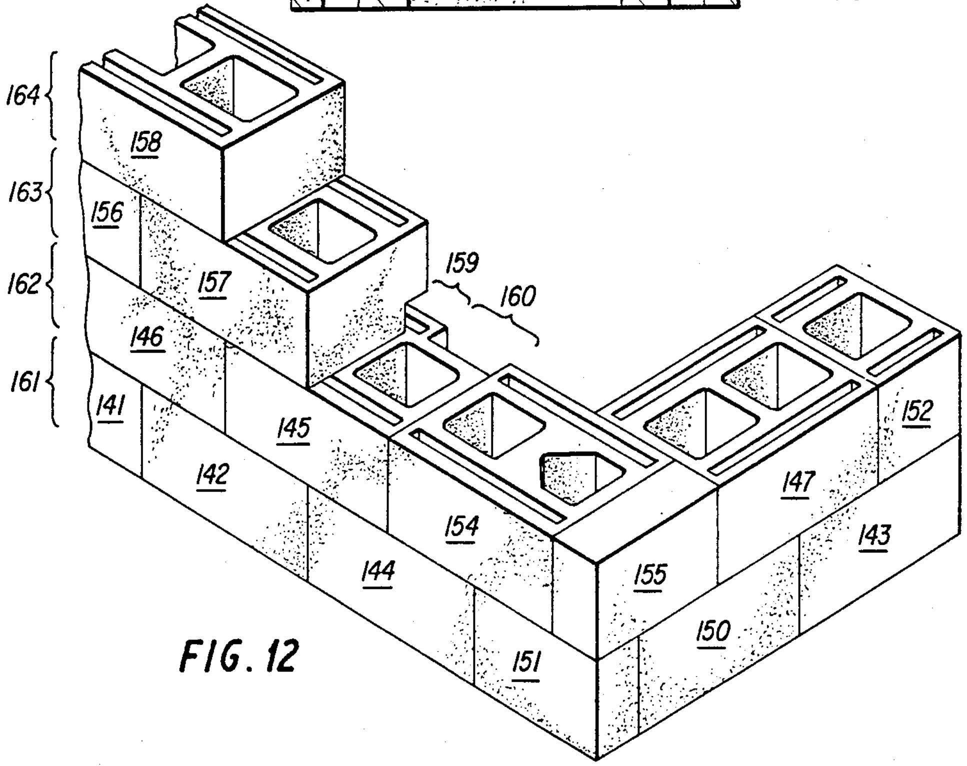
FIG. 12 is a perspective view of the right angle corner of two structural walls built with the ICMUs of the present invention.

FIG. 12 is a perspective view of the partially completed corner of two structural walls constructed with the ICMUs of the present invention. The first horizontal layer, of course, 161 is comprised of standard ICMUs 141–143, VCP ICMU 144, corner ICMU 150, and solid cut CMU 151. Second course 162 comprises VCP ICMU 145, standard ICMUs 146–147, corner ICMU 154, solid cut CMU 155, and a standard half-block ICMU 152. Partially completed third course 163 comprises HCP ICMUs 156 and 157. Partially complete fourth course 164 comprises standard ICMU 158.

The standard half-block ICMU 152 of the present invention is similar to the standard ICMU 147 of the present invention except that it is one-half the length thereof and lacks a mid-wall. The present invention also includes a half-block VCP ICMU, a half-block HCP ICMU and a half-block lintel ICMU, which are not illustrated.

The advantageous use of the VCP and HCP ICMUs of the present invention is illustrated in FIG. 12. In constructing the walls of a structure according to the present invention, one or more courses (typically the third course above each floor of the structure) is constructed of HCP ICMUs. The HCP ICMUs are laid in a single course with the recess facing the interior of the structure so as to provide a continuous horizontal recess 159, which is adapted to receive pre-wired electrical conduit and/or plumbing. A connection with a power source and/or water main, respectively, is provided by electrical conduit or plumbing rising from the floor or down from the ceiling through the continuous vertical recess 160 formed by a part of the vertical recess in each of VCP ICMUs 144 and 145 to conduit and/or plumbing in horizontal recess 159.

The use of the VCP and HCP ICMUs of the present invention allows an electrical and/or plumbing system to be put into the structure with significant savings in time, materials, labor, and cost. When the walls of a structure are built using the ICMUs of the present invention, no furring or dry boarding is used. Therefore, if electrical outlets and plumbing are to be put in, brackets must be attached to the walls to hold the electrical outlets and conduit, and the plumbing in place, which involves a significant amount of labor. When the VCP and HCP ICMUs of the present invention are used, the walls are provided with recesses. Pre-wired conduit, with socket boxes attached, and/or plumbing with fixtures, is inserted into the recesses and then covered over with mortar or filled with an insulating material. This eliminates the need to affix the electrical or plumbing system to the wall with brackets or the like. It is also aesthetically pleasing and safer in that there is no exposed conduit and/or plumbing.

It should be emphasized that the recess in the HCP and VCP ICMUs does not in any way affect their load-bearing capacity. The recess is formed solely by the elimination of a section of one insulating portion. While the recess does remove some insulation, it does so only on the interior face of the wall. The exterior face of the wall is still provided with a continuous insulation barrier. Furthermore, in structures with extreme insulation requirements, the recesses can be filled with an insulation material, bringing the performance of the HCP or VCP ICMU up to that of a regular ICMU.

FIG. 13 is a top elevational view of a right angle corner of two structural walls constructed using the corner ICMUs of the present invention. Two courses are illustrated. The insulation cores of both courses do not have webs and are shown as empty. Thus, some portions of the lower course are visible through the insulation cores of the upper course. Other portions of the lower course are visible through the central cores of the ICMUs of the top course. Dashed lines indicate those portions of the lower course which are not visible.

The top course comprises standard half-block ICMU 175, corner (with a K-shaped mid-wall) ICMU 176, solid cut CMU 177 and standard ICMU 178. The lower course comprises corner (with a K-shaped mid-wall) ICMU 179, standard ICMUs 180 and 181, and solid cut CMU 182. The diagonally lined areas 183 and 184 indicate the areas of the load-bearing portion of corner ICMU 176 in the upper course that are supported by the mid-wall of corner ICMU 179 in the lower course.

Areas 183 and 184 indicate the additional support provided to the corners of structural walls when the corner ICMU is used to construct the corner rather than the standard ICMU. If the standard ICMU of the present invention had been used to construct this corner, areas 183 and 184 would have been totally unsupported. The additional support to the inner load-bearing portion of the upper block 176 in areas 183 and 184 provided by the mid-wall of the corner ICMU 179 increases the load-bearing capacity of the corner.

This increased support is particularly important where the corners of the structure are to be rebarred. In horizontal, or low rise, CMU construction, it is common practice to lay a number of courses of block on all walls, and then rebar the corners of the walls. Rebarring normally comprises inserting vertical steel bars in the corners and then filling the cavity with concrete, and greatly increases the structural capabilities immediately surrounding the corner. Each time rebarring of a corner is undertaken, time and labor must be expended. Thus, the higher the wall can be constructed before rebarring of the corner is necessary, the less frequent the number of rebarring operations necessary, and the greater the savings of time and labor. The present corner ICMU saves time and labor by reducing the number of rebarring operations that must be performed. The number of rebarring operations is reduced because the corner is stronger and more courses can be laid before rebarring is necessary.

The present invention also comprises an ICMU provided with a mid-wall of an X-shape as shown in FIG. 5. If the X-shaped corner ICMU is used, it can be laid by the mason in any manor because both central cores are of pentagonal shape. If the K-shaped corner ICMU is used, then the mason must lay the pentagonal central core directly over the corner so that it can provide the extra support in the corner. The present invention includes a corner HCP ICMU, not illustrated.

The ICMUs of the present invention include those with load-bearing portions having widths of 4, 6, 8, and 12 inches. CMUs of varying widths are used for varying applications. For example, in high rise or vertical construction, a separate concrete floor is normally poured for each storey of the building, and the CMU wall normally has a maximum height of 10 feet. A 4 inch CMU can be used in such an application because the load on the wall is relatively small. In horizontal or low rise construction, CMUs may be laid to height of 30 or 40 feet. This increases the load on the wall and 6 or 8 inch CMUs are normally used. For walls which must bear an extraordinary load, a 12 inch CMU may be used. The preferred embodiments discussed above each dealt with an ICMU having an 8 inch wide load-bearing surface. Corresponding 4, 6, and 12 inch embodiments are also within the scope of the present invention. The dimensions of the load-bearing portion of the 8 inch ICMUs would be adjusted to the dimensions of conventional 4, 6, and 12 inch CMUs, and the outer side walls would be adjusted to the length of load-bearing portion. The outer end walls and the webs (if any) would remain of about the same dimensions. As was stated before, the dimensions of the outer end walls, and the number and dimensions of any webs, could be varied by one of ordinary skill in the art depending on a number of factors, including the precision of the block machine used to produce the ICMUs. One embodiment of a 4 inch ICMU is set forth below.

Figure 14:
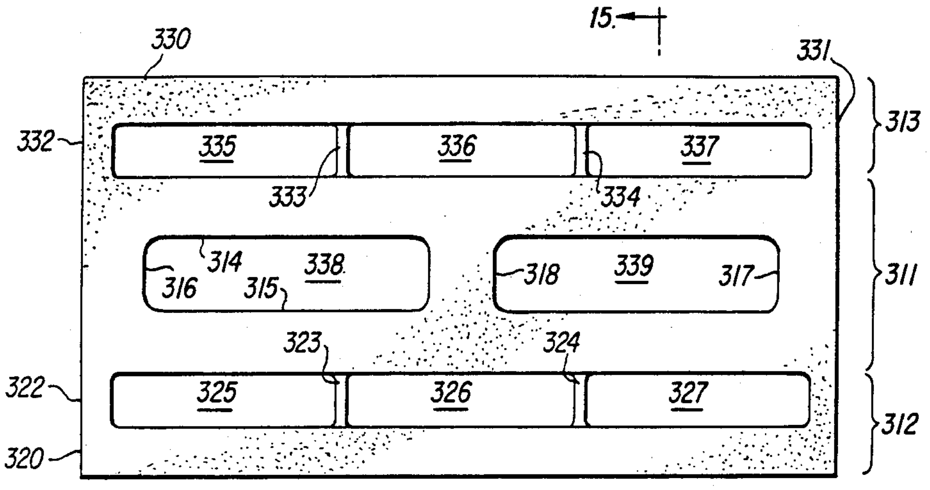
FIG. 14 is a top view of the 4-inch standard ICMU of the present invention.
Figure 15:
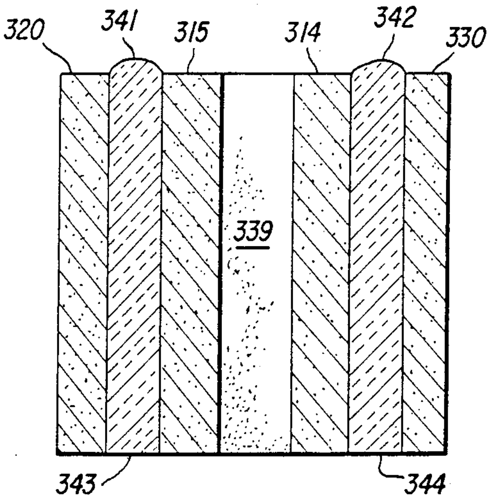
FIG. 15 is a cross-sectional view of the 4-inch standard ICMU of the present invention taken along line 15—15 of FIG. 14.

FIGS. 14 and 15 disclose a 4 inch standard ICMU of the present invention. With reference to FIG. 14, the top view discloses inner load-bearing portion 311 as well as outer insulating portions 312 and 313. Load-bearing portion 311 comprises side walls 314 and 315, end walls 316 and 317, and mid-wall 318. Side walls 314 and 315 are co-extensive with the length of the ICMU. End walls 316 and 317 are continuous with, and connect, side walls 314 and 315. Mid-wall 318 is located at a position approximately equidistant from end walls 316 and 317, and is continuous with, and connects, side walls 314 and 315, thereby forming central cores 338 and 339.

Insulating portion 312 comprises outer end walls 321 and 322, webs 323 and 324, and outer side wall 320. Outer side wall 320 is co-extensive with the length of the ICMU, and is connected to load-bearing side wall 315 by outer end walls 321 and 322, and by webs 323 and 324, thereby forming insulation cores 325, 326, and 327.

Insulating portion 313 comprises outer side wall 330 that is connected to load-bearing side wall 314 by outer end walls 331 and 332, and webs 333 and 334 thereby forming insulation cores 335, 336, and 337.

FIG. 15 shows a cross section of the 4 inch standard ICMU of the present invention taken along line 15—15 of FIG. 14. In FIG. 14 insulation cores 327 and 337 are illustrated as empty before being filled with insulative material. In FIG. 15, these insulation cores are shown as filled with insulative material 343 and 344. Insulative material 343 is continuous with outer side wall 320, webs 323 and 324, and inner load-bearing side wall 315. Insulative material 343 is flush with the bottom of the ICMU and terminates in rib 341. Insulative material 344 is continuous with outer side wall 330, webs 333 and 334, and inner load-bearing side wall 314. Insulative material 344 is flush with the bottom of the ICMU and terminates in rib 342. Ribs 341 and 342, which can be incorporated into all sizes and types of ICMUs, are adapted to contact the insulative material in the ICMU placed directly on top of the illustrated ICMU so as to form a more essentially continuous insulation barrier when mortar is used in the construction technique.

In the preferred embodiment, the 4 inch standard ICMU of the present invention has an overall length of 16 inches, an overall height of 8 inches, and an overall width of $7\frac{5}{8}$ inches. Side walls 314 and 315 are tapered from a width of $1\frac{1}{8}$ inches at the top to $1\frac{1}{4}$ inches at the bottom. End walls 316 and 317 are provided with flat exterior surfaces, taper from a width of $1\frac{1}{4}$ inches at the top to $1\frac{1}{2}$ inches at the bottom, and are $1\frac{5}{8}$ inches in length. Mid-wall 318 is also $1\frac{5}{8}$ inches in length, has a width of $1\frac{3}{8}$ inches at the top, and tapers out gradually to a point $1\frac{7}{8}$ inches from the bottom, at which point it flares to a width of 3 inches for the bottom $\frac{5}{8}$ inch of the wall. Outer end walls 321, 322, 331, and 332 taper from a width of $\frac{3}{8}$ inch at the top to $\frac{1}{2}$ inch at the bottom, are $1\frac{1}{4}$ inches long, and are provided with flat exterior surfaces. Outer side walls 320 and 330 are provided with flat exterior surfaces and taper from a width of $\frac{5}{8}$ inch at the top to 13/16 inch at the bottom. Webs 323, 324, 333, and 334 are $1\frac{1}{4}$ inches long, flush with the bottom of the ICMU, $5\frac{1}{2}$ inches in height and taper from a width of $\frac{3}{8}$ inch at the top to $\frac{1}{2}$ inch at the bottom. Central cores 338 and 339 are provided with corners on $\frac{1}{2}$ inch radius.

The ICMU of the present invention can be made by a method that is easily integrated with processes of making conventional CMU's. Flow Diagram 1 illustrates the preferred method of making the present ICMU's:

FLOW DIAGRAM 1

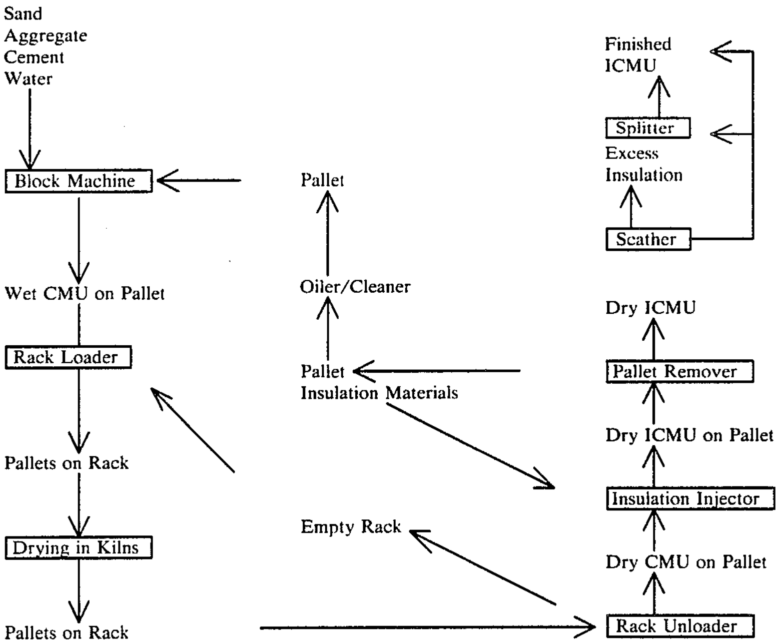

Sand, aggregate, cement and water are supplied to the block machine together with a clean and oiled pallet. The block machine deposits a wet CMU on the pallet that is conveyed to the rack loader which loads a predetermined number of pallets onto a rack. The rack is put into a drying apparatus (such as a steam kiln), the wet CMU is dried (which may take 8 hours in a steam kiln), and the rack is taken to the rack unloader. The rack unloader removes the pallets from the rack and places them on a conveyor. The insulation injector then stops the conveyor as each pallet is positioned underneath it and injects insulation into the insulation cores of the dry CMU, thereby forming the ICMU. The dry ICMU moves on down the conveyor to the pallet remover, which slides the dry ICMU off the pallet. The ICMU is preferably pushed off the pallet in a direction perpendicular to the length of the insulation cavities. The removed pallet is conveyed to the oiler/cleaner, which prepares it for resue. The dry ICMU is then conveyed to the scather, which removes any excess insulation from the top of the insulation cavities. If split-faced ICMUs are being prepared, the double ICMU is then conveyed to the splitter, which breaks it in half to form two finished split-faced ICMUs. If the ICMUs being prepared are not split-faced, then the finished ICMU exits from the scather.

In one preferred embodiment of the present method, the scather is provided with a beveled edge, whereby $\frac{3}{8}$ inch of insulation is allowed to extend upward from the top surface of the ICMU directly over each insulation cavity.

Figure 16:
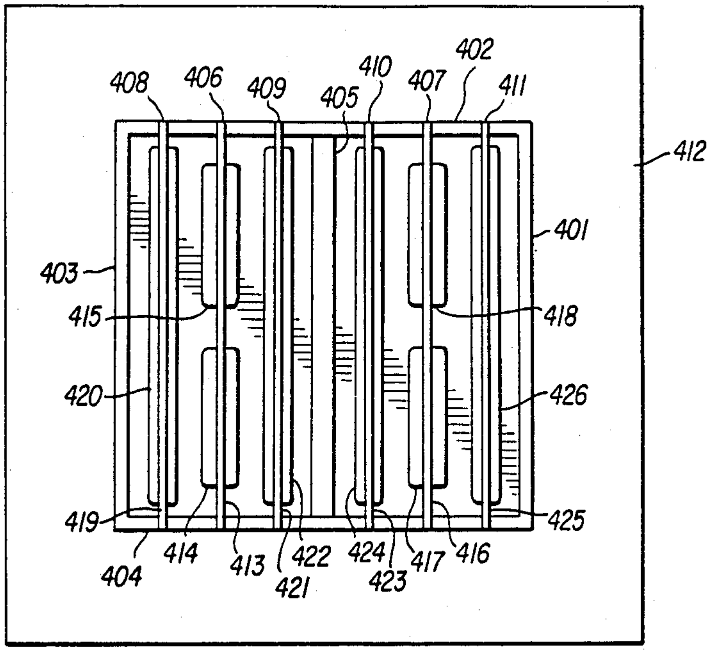
FIG. 16 is a top view of a mold box used to make two standard 4 inch ICMUs of the present invention.

FIG. 16 illustrates a top view of a mold box to form two 4-inch ICMUs of the present invention. The mold box comprises four exterior walls 401, 402, 403, and 404, partition plate 405, central corebar assemblies 406, 407, and insulation corebar assemblies 408, 409, 410, and 411. The mold box is shown resting on pallet 412. Central corebar assembly 406 comprises bar 413, to which central cores 414 and 415 are attached. Central corebar assembly 407 comprises bar 416 to which central cores 417 and 418 are attached. Insulation corebar assembly 408 comprises bar 419 to which insulation core 420 is attached. Insulation corebar assembly 409 comprises bar 421 to which insulation core 422 is attached. Insulation corebar assembly 410 comprises bar 423 to which insulation core 424 is attached. Insulation corebar assembly 411 comprises bar 425 to which insulation core 426 is attached. Bars 413, 416, 419, 421, 423, and 425 are affixed to tops of walls 402 and 404. Central cores 414, 415, 417, and 418 extend from the pallet 412 to the top surface of the mold box. Insulation cores 420, 422, 424, and 426 extend from the pallet 412 to the top surface of the mold box.

The mold box is designed to make two of the 4 inch standard ICMUs of the type shown in FIGS. 14 and 15: one to the left of partition plate 405; and the other to the right of partition plate 405. Considering the one on the left, central cores 414 and 415 of the mold box of FIG. 16 make the central cores 338 and 339, respectively, of the ICMU of FIG. 14. Insulation cores 420 and 422 of the mold box make insulation cores 335 through 337 and 325 through 327, respectively, of the ICMU. The lower portions of insulation cores 420 and 422 are provided with apertures (not shown) to make webs 323, 324, 333, and 334.

Figure 17:
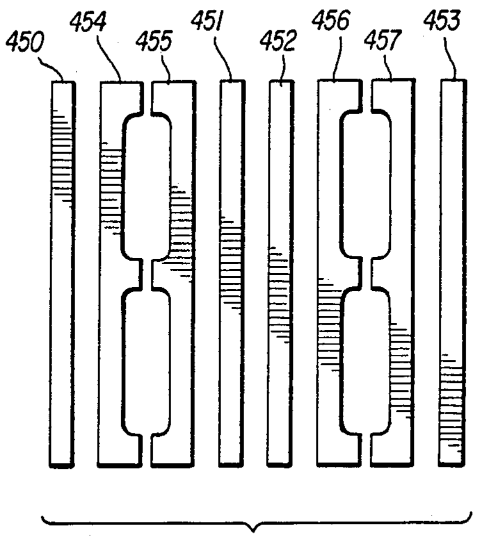
FIG. 17 is a bottom view of the shoes for the mold box of FIG. 16.

FIG. 17 is a bottom view of the plunger shoes for the mold box of FIG. 16. Outer side wall shoes 450, 451, 452, and 453 are identical and are adapted to compress the outer side walls of the two ICMUs formed by the mold box of FIG. 16. Left-hand shoe 454 is symetrical with right-hand shoe 455. Shoes 456 and 457 are identical to shoes 454 and 455, respectively. Shoes 454, 455, 456, and 457 are adapted to compress all load-bearing walls of the ICMUs produced by the mold box of FIG. 16. The three narrow gaps between left-hand shoe 454 and right-hand shoe 455 (the gaps are over the center of each of the two end walls and the mid-wall of the ICMU) are necessary so that the shoes will not strike bar 413 on the top of the mold box during the compression step. The gaps are about $\frac{3}{8}$ inch wide and the core bar is about ½ inch thick. Shoes 450 through 457 are adapted to pass around cores 414–415, 417–418, 420, 422, 424, and 426 of the mold box. It is critical that the outer end walls and the webs of the ICMU are not compressed.

The present invention includes mold boxes and shoes for all of the ICMUs disclosed. In each case, the shoes and mold boxes interact to compress the inner load-bearing portion and the outer side walls of the ICMU. However, it is critical that the shoes do not compress the outer end walls and the webs.

Figure 18:
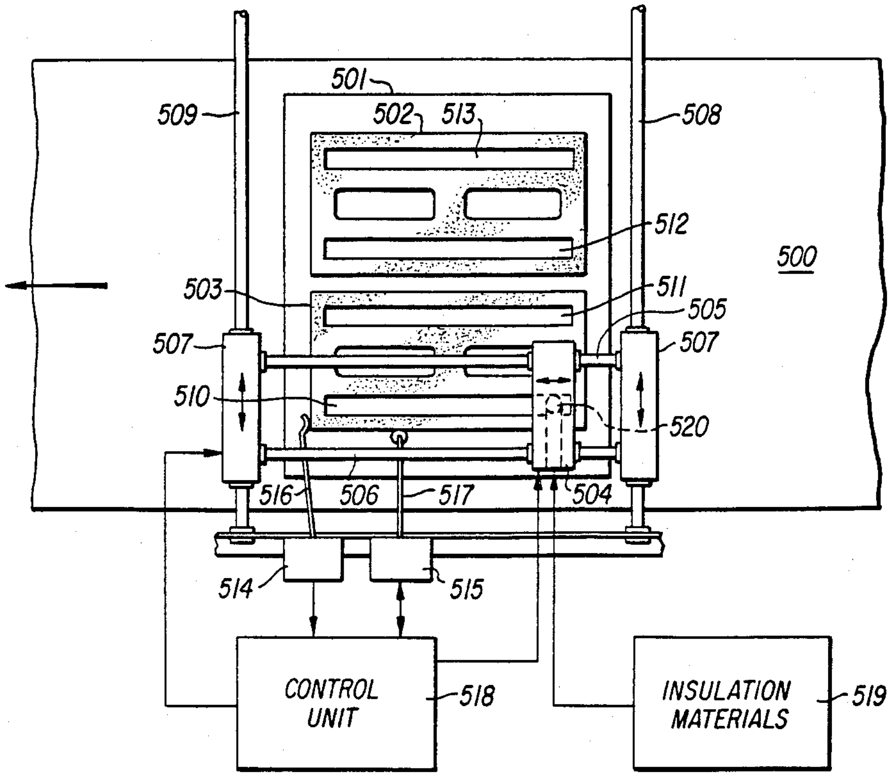
FIG. 18 is a top view of the insulation injector of the present invention.

FIG. 18 discloses a top view of an insulation injector according to the present invention. The injector is placed above and adjacent to conveyor 500, which conveys pallets bearing dried CMUs in the direction indicated by the arrow from the rack unloader to the insulation injector (where insulation is injected forming an ICMU), to the pallet remover and then to the scather as more fully illustrated in the Flow Diagram 1 above. As the conveyor 500 moves the pallet 501 containing two dry CMUs 502 and 503 in the direction of the arrow, pivotally mounted lever 516 is rotated about its vertical axis. When the leading edge of CMU 503 is in the appropriate position, sensor 514 transfers this information to control unit 518 which stops conveyor 500. Control unit 518 then directs sensor 515 to extend probe 517 until it contacts CMU 503. Probe 517 is extended and sensor 515 notifies the control unit 518 of the location of CMU 503 Control unit 518 then positions injector nozzle 520 in its starting position.

Injector nozzle 520 is mounted on injector carrier 504. Injector carrier 504 contains valves to control the flow of insulation materials 519 to nozzle 520, apparatus for raising and lowering injector nozzle 520, and means to move along the length of support bars 505 and 506. Bars 505 and 506 are mounted on transverse carrier 507. Transverse carrier 507 contains means to move along the length of cross bars 508 and 509.

Once the conveyor has been stopped, control unit 518 determines the exact position of the CMU 503 from sensors 514 and 515 as previously discussed. It then positions transverse carrier 507 and injector carrier 504 in such a position that nozzle 520 is located over the end of insulation core 510. Control unit 518 opens valves in the insulation carrier 504 so that nozzle 520 begins injecting insulated material into core 510. As injection continues, carrier 504 is moved by the control unit along the length of core 510, injection is stopped, nozzle 520 is moved transversely to the end of core 511, injection is again begun, and nozzle 520 is moved the length of core 511, injection is stopped, nozzle 520 is moved transversely to the end of core 512, injection is begun, the nozzle moves the length of core 512, injection is stopped, the nozzle is moved to the end of core 513, injection is begun, the nozzle is moved the length of core 513, and injection is stopped. At this point, control unit 518 allows conveyor 500 to again operate so as to move the next set of CMUs unit into position. Injection nozzle 520 is returned to its starting position.

Control unit 518 is provided with means to vary the injection path of nozzle 520 to allow for the various types of ICMUs of the present invention. Optionally, control unit 518 may be provided with additional sensors to automatically sense the type of ICMU being made. Optionally, injector carrier 504 may be provided with sensor means, which when acting in conjunction with a microprocessor can detect insulation cores.

In the preferred embodiment of the present method, the location of the insulation injector immediately after the rack unloader is preferred because the dry CMUs on pallets are still warm from drying when the insulation is injected into the insulation cores. The higher temperature of the pallet and dry CMUs aids the reaction between the insulation materials which are injected into, and react in, the insulation cores to form the insulation foam. When injected into a warm core sealed by a warm pallet, the conditions are ideal for the chemical reaction. If injected into a cool core, more chemicals would be required, increasing the cost and reducing the insulation performance.

In one embodiment of the present invention, the insulative material in the insulation cores of the finished ICMUs is a foamed polyurethane having a density between 1.0 and 5.0 pounds per cubic foot. A preferred density is between 1.2 and 4.0 pounds per cubic foot and a more preferred density is between 1.4 and 3.0 pounds per cubic foot. The most preferred density is between 1.8 and 2.2 pounds per cubic foot. It is preferred to use injection machines, also known as injection molding, or pour machines, because they are very accurate in achieving the desired density.

FIGS. 19 through 24 are a schematic side view and partial cross-section of the major steps of the method of making the concrete masonry material portion of an ICMU of the present invention. The basic steps of the method are well-known to the art and are used to make CMUs. However, the interaction of the shoes and the mold box more fully described above with respect to FIGS. 16 and 17 to produce a CMU havng outer end walls and webs (if any) of a much lower density than the other walls of the CMU is unknown to the prior art.

Figure 19:
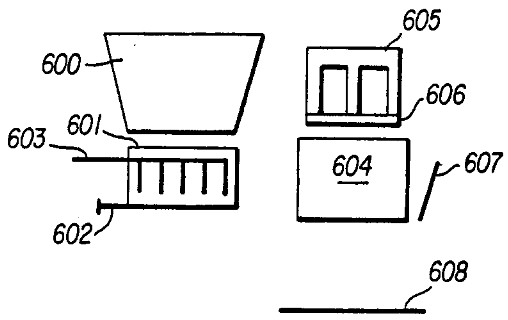
FIGS. 19 through 24 are a schematic side view and partial crosssection of a block machine carrying out the major steps of the method of making the concrete masonry material portion of an ICMU of the present invention.

FIG. 19 illustrates hopper 600 that contains the moist concrete masonry materials used to make the CMU portion of the ICMUs of the present invention. These concrete masonry materials normally comprise cement, lightweight aggregate, water and, in some cases, sand. These concrete masonry materials will normally have been thoroughly mixed before being placed in the hopper.

Feed box 601 is positioned directly below hopper 600 and is adapted to receive the moist concrete masonry materials when the bottom of hopper 600 is open. Feed box 601 comprises removable feed box bottom 602 and agitator rake 603. Moist concrete masonry material (not shown) has previously been deposited into feed box 601 from hopper 600. At this point, agitator rake 603 would preferably be violently agitating the moist concrete masonry material in feed box 601. However, it is possible for this agitation to begin at a later step of the method.

FIG. 19 also illustrates plunger assembly 605, which comprises a horizontal member at the top, to which are affixed a plurality of downward extending legs. Plunger shoes 606 are affixed to the ends of the plurality of legs of plunger assembly 605. Hereinafter, plunger assembly 605 will include plunger shoes 606, unless plunger shoes 606 are separately referred to. Also shown is scrape-off plate 607 and pallet 608. At this step of the continuous method, clean pallet 608 has just been placed in position. The elements referred to in the foregoing are all elements of conventional block machines known to the art.

Figure 20:
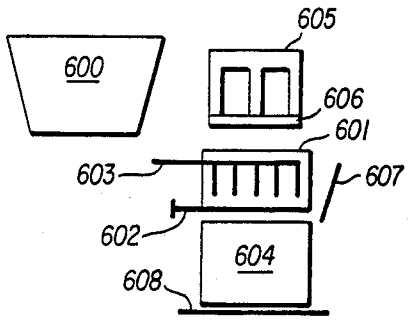

FIG. 20 shows the second step of the continuous method. Mold box 604 has been lowered into contact with pallet 608. Feed box 601, including feed box bottom 602 and agitator rake 603, has been moved horizontally from a position under the hopper 600 to a position directly over mold box 604 and directly beneath plunger assembly 605. Once again, at this point it is preferred that agitator rake 603 would be violently agitating the moist concrete masonry material (not illustrated) within feed box 601.

Figure 21:
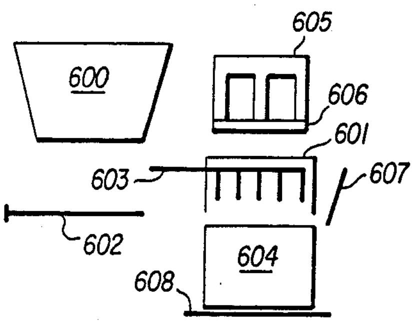

FIG. 21 illustrates the third step of the continuous method. Immediately before this step, it is required that agitator rake 603 be violently agitating the moist concrete masonry material (not illustrtated) in feed box 601. In this step of the method, feed box bottom 602 has been moved horizontally to the left from a position directly below feed box 601 to a position directly below hopper 600. As agitator rake 63 is violently agitating and feed box bottom 602 is being moved horizontally to the left, moist concrete masonry material (not illustrated) is falling from feed box 601 into mold box 604.

Figure 22:
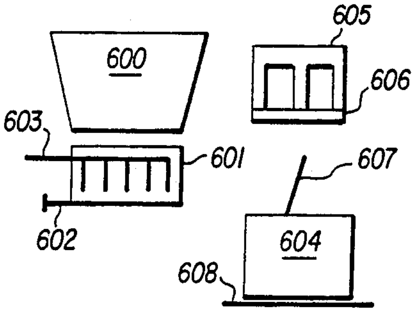

FIG. 22 illustrates the fourth step of the continuous method. Feed box 601, including agitator rake-603 has been moved horizontally to the left from a position directly above mold box 604 to a position directly below hopper 600 and directly above feed box bottom 602. Scrape-off plate 607 is shown moving horizontally to the left to scrape any excess moist concrete masonry material (not illustrated) from the top of the mold box. Mold box 604 includes cores, partition plates, and bars more fully illustrated in FIG. 16. Scrape-off plate 607 is provided with grooves corresponding to the bars across the top of the mold box. At this point, the moist concrete masonry material (not illustrated) within mold box 604 has a relatively low density because a great deal of air has been mixed into the material by the violent agitation of agitator rake 603. At least the load-bearing portions of the CMU must now be compacted to provide a sufficient density to meet the load-bearing requirements placed on the CMU. This compaction is carried out in the next step of the method.

Figure 23:
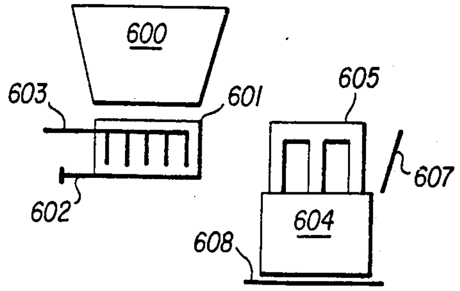

FIG. 23 illustrates the fifth step of the continuous method. Plunger assembly 605 has been moved vertically downward so that plunger shoes 606 (not visible) contact the top surface of at least all load-bearing walls, and compact these walls by virtue of the downward pressure exerted on plunger assembly 605 by elements of the block machine not illustrated. As can be seen, scrape-off plate 607 has returned to its rest position. At this point in the method, the bottom of hopper 600 opens and moist concrete masonry material falls into feed box 601. As soon as the bottom of hopper 600 has closed, it is preferred that agitator rake 603 begin violently agitating the moist concrete masonry material (not illustrated) in feed box 601.

Figure 24:
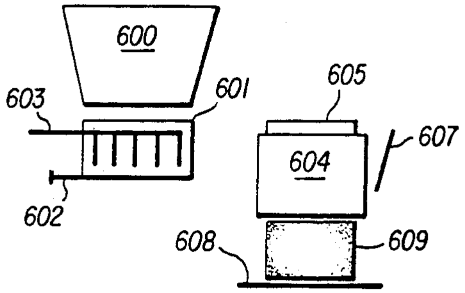

FIG. 24 illustrates the sixth step of the continuous method. Mold box 604 has been moved vertically upward around plunger assembly 605. As mold box 604 moves vertically upward, the plunger assembly remains in a stationary position, and plunger assembly shoes 606 hold finished moist CMU 609 in position on pallet 608. Subsequently, mold box 604 and plunger assembly 605 are moved slightly above the top surface of moist CMU 609 so that when pallet 608 is removed, the top of CMU 609 is not contacted by mold box 604 or plunger shoes 606. After pallet 608 bearing moist CMU 609 has been removed, a clean pallet is put into the position shown in FIG. 19, and the method continues.

FIGS. 19 through 24 show one preferred method of making the CMU portion of the ICMUs of the present invention. Obviously, minor modifications of this method are possible without departing from the concept of the present invention. What is common to the production of all conventional CMUs in commercial production today is the depositing of a low density mixture of moist concrete masonry material and air into a mold box, which is of insufficient density to meet the load-bearing requirements placed on conventional CMUs. The minimum density required of conventional CMU is achieved by compacting the material in the mold box by a plurality of plunger shoes which come in to contact with the top surface of the moist concrete masonry material in the mold box and compress it by downward force. The outer end walls and the webs (if any) of the ICMUs of the present invention have a much lower density than the walls of the load-bearing portion and the outer side walls because the mold boxes and the plunger shoes of the present invention interact in such a way that the outer end walls and the webs (if any) are not compressed.

Figure 25:
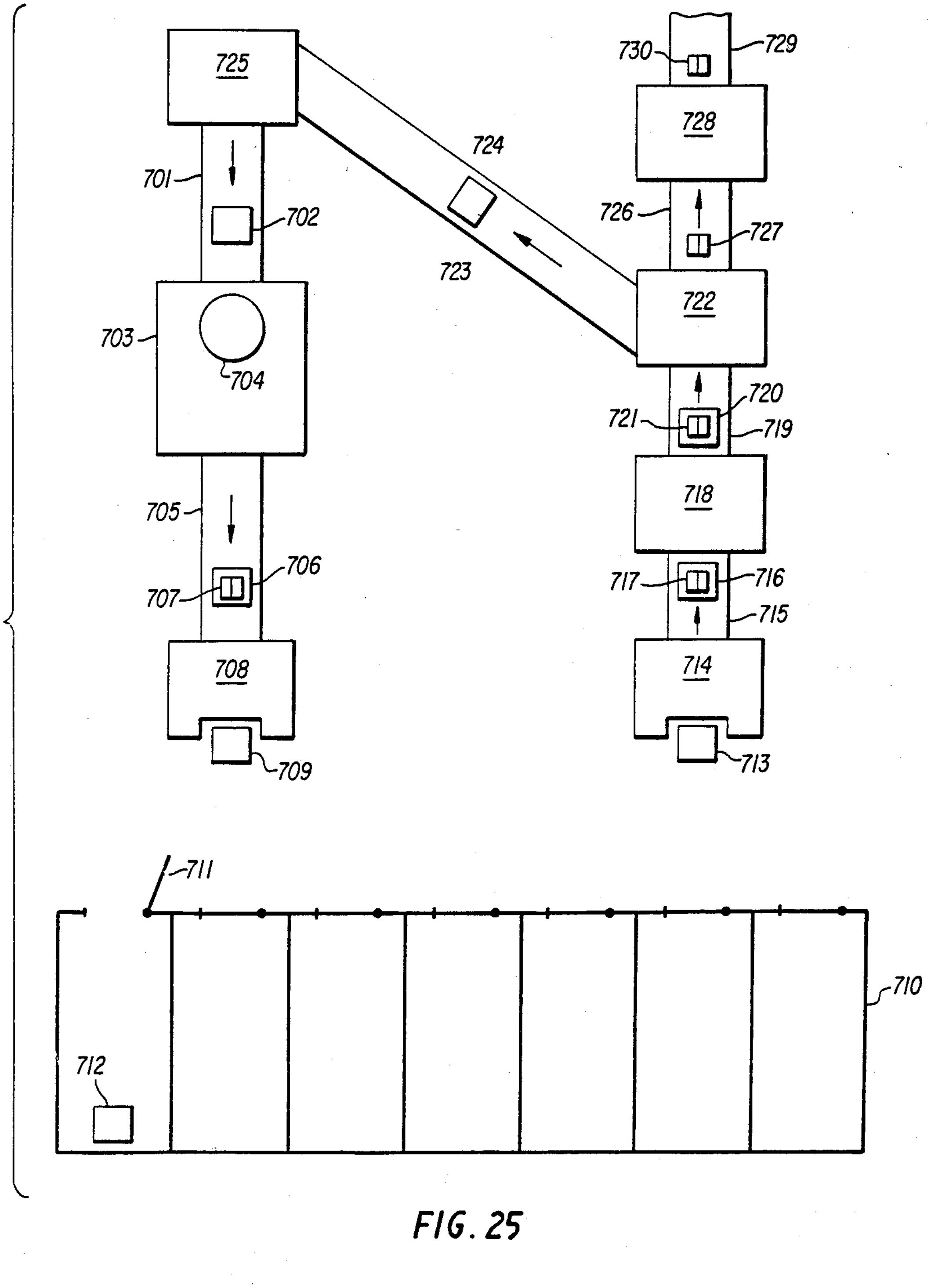
FIG. 25 is a schematic top view of the production of the ICMUs of the present invention in a conventional CMU plant.

FIG. 25 is a schematic top view of the production of the ICMUs of the present invention in a conventional CMU plant. Conveyor 701 moves clean pallet 702 to block machine 703. Hopper 704 is visible on the top of block machine 703. The operation of block machine 703 is more fully described in the foregoing discussion of FIGS. 19 through 24.

Conveyor 705 moves pallet 706 containing moist (or "green") CMUs 707 from block machine 703 to rack loader 708. A number pallets 706 are loaded by rack loader 708 onto rack 709. When rack 709 is fully loaded, it is conveyed to one of a series of steam drying kilns 710. Kiln door 711 is shown in the open position and rack 712 is shown in the far end of the kiln.

After moist (or "green") CMUs have been dried in one of steam drying kilns 710, the rack is moved to rack unloader 714, as shown by the position of rack 713. Rack unloader 714 removes pallets from rack 713 and places them on conveyor 715. Conveyor 715 then moves pallet 716 bearing dry CMUs 717 to insulation injector 718. The distance between rack unloader 714 and injector 718, as shown in FIG. 25, is exaggerated for clarity. The preferred distance is closer. The operation of insulation injector 718 is more fully described in the foregoing discussion of FIG. 18.

Conveyor 719 moves pallet 720 bearing dry ICMUs 721 to pallet remover 722. The change from CMU before insulation injector 718 to ICMU after it is because the insulating material is added to the insulation cores of the CMU to make an ICMU by the insulation injector 718.

Pallet remover 722 removes pallets from the dry ICMUs and places them on conveyor 723. Used pallet 724 is conveyed by conveyor 723 to the pallet oiler and cleaner 725, which oils and cleans each pallet, and then places the clean pallets on conveyor 701.

Pallet remover 722 places dry ICMUs 727 on conveyor 726, which conveys them to scather 728. Any excess insulation on the top of the dry ICMUs is removed by scather 723. Scather 728 can be adjusted so that the top of the insulation material in the insulating cores is flush with the top of ICMU, or it can be adjusted to provide a beveled edge on the top of the insulating materials as more fully illustrated in FIG. 15.

Scather 728 places finished ICMUs 730 on conveyor 729. If split-faced ICMUs are being produced, conveyor 729 will convey them to a splitter, and then to the termination of the production facility. If ICMUs without split-facing are being produced, then conveyor 729 will convey them to the termination of the production process. At the termination of the production process, the ICMUs are normally taken to a storage facility.

As is shown by FIG. 25, one of the advantages of the ICMUs of the present invention is the fact that a conventional CMU plant can be converted to make them with only minor changes. Specifically, a new mold box and plunger assembly must be installed in the block machine (a common procedure), and the insulation injector must be added. Optionally, insulative material can be injected by hand or at another location. Moreover, the CMU plant can easily return to producing standard CMUs by changing the mold box and plunger assembly, and turning the insulation injector off.

Figure 26:
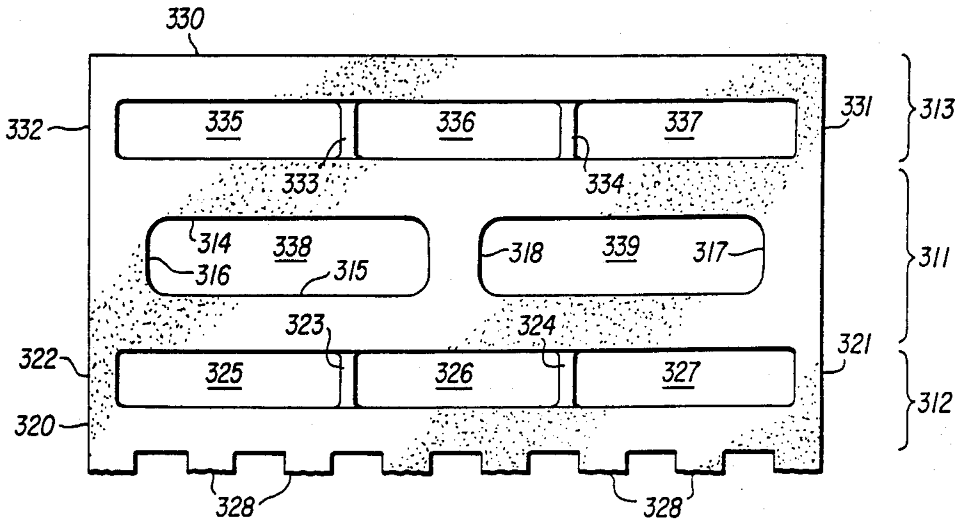
FIG. 26 is a top view of a ribbed, split-faced, 4-inch standard ICMU of the present invention.

FIG. 26 is a top view of a ribbed, split-faced, 4-inch standard ICMU of the present invention. It is identical to the 4-inch standard ICMU of FIGS. 14 and 15, except that outer side wall 320 is provided with a plurality of ribs 328. Ribs 328 are of random length, but average approximately ½ inch in length. RIbs 328 are about 1⅛ inches in width and are about 1 inch from each other. Optionally, both outer side walls can be provided with ribs. In addition, ribbed outer side walls can be used for any other side wall or outer side wall of any ICMU of the present invention, except those forming either a horizontal or a vertical recess.

In order to make the ICMUs compatible with varying wall heights and designs, the height of the ICMU can be varied. Typical heights include 4 and 8 inches. In addition, the length of theICMU can be varied for various applications. However, a length of about 16 inches is the industry standard.

What is claimed is:

1. A process of producing a concrete masonry unit comprising the steps of:

(a) forming a uniform mixture of aggregate, concrete and water, (b) agitating the mixture of step (a) thereby incorporating air into the mixture, (c) placing the moist, agitated mixture of step (b) into a mold box, said mold box adapted to produce a concrete masonry unit comprising a first load-bearing side wall attached to first and second load-bearing end walls in a perpendicular relationship, and a second load-bearing side wall attached to said first and second load-bearing end walls in a perpendicular relationship thereby forming at least one central core, said concrete masonry unit further comprising a first outer side wall attached to first and second outer end walls in a perpendicular relationship, said first outer end wall attached to said first load-bearing end wall, said second outer end wall attached to said second load-bearing end wall, said first outer side wall being in a parallel relationship with said first load-bearing side wall thereby forming a first insulation core, whereby said first and second outer end walls are heat bridges between said first outer side wall and said first and second load-bearing end walls, (d) compacting said agitated mixture of step (b) in said mold box of step (c) by means of plunger shoes adapted to compress each of said load-bearing walls but not said heat bridge outer end walls, (e) removing the product of step (d) from said mold box, and (f) drying said product of step (e), thereby producing a concrete masonry unit having a composition of a uniform concrete masonry material; wherein said outer end walls are not compacted in said step (d) whereby said outer end walls have a significantly lower density than said load-bearing walls and said outer side walls, said lower density caused by a greater amount of air being present in the concrete masonry material, and the rate of heat transfer from said outer side wall to said load-bearing walls is reduced.

2. The process of claim 1, further comprising the step:

(g) placing an insulative material into said first insulation core, thereby producing an insulated concrete masonry unit.

3. The process of claim 1, wherein said concrete masonry unit further comprises a load-bearing mid-wall located approximately equidistant between said load-bearing end walls and parallel to said load-bearing end walls, said load-bearing mid-wall connecting the middle of said first load-bearing side wall to the middle of said second load-bearing side wall, said load-bearing mid-wall dividing said one central core into first and second central cores.

4. The process of claim 1, wherein said concrete masonry unit further comprises a second outer side wall attached to third and fourth outer end walls in a perpendicular relationship, said third outer end wall attached to said first load-bearing end wall, said fourth outer end wall attached to said second load-bearing end wall, said second outer side wall being in a parallel relationship with said second load-bearing side wall thereby forming a second insulation core.

5. The process of claim 4, whereinsaid first and second outer side walls are of the same density as said load-bearing walls.

6. The process of claim 5, wherein said load-bearing walls have a minimum strength of 1200 lbs./cu.in., and a density of less than 100 lbs/cu.ft.

7. The process of claim 6, wherein said concrete masonry unit further comprises a first web and a second web in said first insulation core connecting said first load-bearing side wall to said first outer side wall, and a third web and a fourth web in said second insulation core connecting said second load-bearing side wall to said second outer side wall, and said webs are of significantly lower density than said load-bearing walls.

8. The process of claim 7, wherein said load-bearing walls have a compression strength of more than 1300 lbs./cu.in., and a density of less than 90 lbs./cu.ft.

9. The process of claim 8, wherein said load-bearing walls have a compression strength of more than 1500 lbs./cu.in., and a density of less than 80 lbs./cu.ft., and said outer end walls and said webs have density at point midway between said load-bearing side walls and said outer side walls that is about 60% of the density of said load-bearing walls.

10. The process of claim 7, wherein said outer end walls and said webs have a density at a point midway between said load-bearing side walls and said outer side walls that is less than about 75% of the density of said load-bearing walls.

11. The process of claim 4, wherein said process further comprises the step:

(g) placing an insulative material into said first and second insulation cores.

12. The process of claim 4, wherein said outer side walls are of a density which is greater than the density of said outer end walls, but which is less than the density of said load-bearing walls.

13. A process of producing an insulated concrete masonry unit comprising the steps of:

(1) forming a mixture of aggregate, concrete and water;

(2) agitating the mixture of step (1) thereby incorporating air into the mixture;

(3) placing the moist, agitated mixture of step (2) into a mold box adapted to produce a concrete masonry unit comprising load-bearing walls and heat bridge walls;

(4) compacting said agitated mixture of step (2) in said mold box of step (3) by means of plunger shoes adapted to compress said load-bearing walls but not said heat bridge walls;

(5) removing the product of step (4) from said mold box; and (6) drying said product of step (5) thereby producing a concrete masonry unit having a first insulation core.

14. The process of claim 13 further comprising the following step:

(7) placing an insulative material into said first insulation core thereby producing an insulated concrete masonry unit.

15. The process of claim 14 further comprising the following step:

(8) preparing said insulated concrete masonry unit for storage or shipment.

* * * * *